United States Patent
Kim

(10) Patent No.: US 11,312,417 B2
(45) Date of Patent: Apr. 26, 2022

(54) RIGIDITY REINFORCEMENT STRUCTURE OF A REAR UNDERBODY OF A VEHICLE

(71) Applicants: HYUNDAI MOTOR COMPANY, Seoul (KR); KIA MOTORS CORPORATION, Seoul (KR)

(72) Inventor: Hyung-Tae Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 119 days.

(21) Appl. No.: 16/854,234

(22) Filed: Apr. 21, 2020

(65) Prior Publication Data
US 2021/0206431 A1  Jul. 8, 2021

(30) Foreign Application Priority Data
Jan. 2, 2020 (KR) .................. 10-2020-0000466

(51) Int. Cl.
| B62D 21/03 | (2006.01) |
| B62D 27/02 | (2006.01) |
| B62D 25/20 | (2006.01) |
| B62D 25/08 | (2006.01) |

(52) U.S. Cl.
CPC ............ *B62D 21/03* (2013.01); *B62D 25/08* (2013.01); *B62D 25/2036* (2013.01); *B62D 27/02* (2013.01)

(58) Field of Classification Search
CPC combination set(s) only.
See application file for complete search history.

(56) References Cited

U.S. PATENT DOCUMENTS 10,377,218 B1 * 8/2019 Pachore ................. B62D 25/08

FOREIGN PATENT DOCUMENTS

| GB | 2475973 A | * 6/2011 | ............. B62D 25/20 |
| KR | 20030088778 A | 11/2003 | |

* cited by examiner

*Primary Examiner* — Lori L Lyjak
(74) *Attorney, Agent, or Firm* — Lempia Summerfield Katz LLC

(57) ABSTRACT

A rigidity reinforcement structure of the rear underbody of a vehicle may include: a transverse member disposed in the width direction of the vehicle at a site adjacent to the rear end of the vehicle; a rearside member disposed in the longitudinal direction of the vehicle and having a rear end located below the transverse member; and a transverse reinforcement member formed in the vertical direction of the vehicle and having an upper portion bonded to the transverse member and a lower portion bonded to the rearside member.

18 Claims, 9 Drawing Sheets

RIGIDITY REINFORCEMENT STRUCTURE OF A REAR UNDERBODY OF A VEHICLE

CROSS-REFERENCE TO RELATED APPLICATION

This application claims priority to Korean Patent Application No. 10-2020-0000466, filed on Jan. 2, 2020, which is incorporated herein by reference in its entirety.

BACKGROUND OF THE DISCLOSURE

Field of the Disclosure

The present disclosure relates to a rigidity reinforcement structure of the rear underbody of a vehicle. The rigidity reinforcement structure integrates components mounted to the lower portion of a D pillar of the vehicle, thereby improving the rigidity of the rear of the vehicle.

Description of Related Art

A vehicle such as a Sport Utility Vehicle (SUV) is provided with a D pillar, which supports a roof and supports the side surface of a tailgate at the rear end of the vehicle.

As shown in FIGS. 1-4, the lower portion of such a D pillar is installed with a transverse member 111 installed in the width or transverse direction (T direction) of the vehicle with both ends connected to the lower ends of the D pillars and disposed in the T direction of the vehicle. The lower portion of the transverse member 111 is installed with a rearside member 112 disposed in the longitudinal direction (L direction) of the vehicle and mounted with a floor panel 113.

The interior of the transverse member 111 is provided with a bulkhead 115 for reinforcing the inside of the transverse member 111. The rear end of the rearside member 112 is also provided with a rearside member plate 116 for adding reinforcing strength. The bulkhead 115 and the rearside member plate 116 reinforce the torsional rigidity of a vehicle body by reinforcing the transverse member 111 and the rearside member 112.

A transverse interior side reinforcement member 117 is applied to the interior side of the connection site of the transverse member 111 and the rearside member 112 to reinforce the strength of the connection site.

Such a structure has a problem in that the bulkhead 115 and the rearside member plate 116 are separated from each other (see FIGS. 2 and 4), thereby not sufficiently reinforcing the torsional rigidity of the vehicle body. In order to solve this, the thicknesses of the bulkhead 115 and the rearside member plate 116 can be increased, or another reinforcement member can be added. However, this greatly increases the weight of the vehicle relative to the rigidity reinforcement effect or is limited by the layout. In addition, the increase in the thicknesses of the bulkhead 115 and the rearside member plate 116 and the application of the additional reinforcement member may increase the cost of the vehicle.

In addition, there is a problem in that since the bulkhead 115 and the rearside member plate 116 are separated from each other, some sections are not bonded to each other (see FIG. 3) or are not applied with a sealer. Thus, airtightness is not possible, thereby flowing moisture or an exhaust gas into the interior.

The contents described in the Description of Related Art section are to help in understanding the background of the present disclosure and thus can include what is not previously known to those having ordinary skill in the art to which the present disclosure pertains.

SUMMARY OF THE DISCLOSURE

The present disclosure is intended to solve the above problems. An object of the present disclosure is to provide a rigidity reinforcement structure of the rear underbody of the vehicle. The rigidity reinforcement structure can improve the strength of a site where a transverse member is applied at the lower rear end of the vehicle.

Another object of the present disclosure is to provide a rigidity reinforcement structure of the rear underbody of the vehicle that can overcome the limitations of the layout of a vehicle body while having a large effect of increasing rigidity relative to the added weight.

A rigidity reinforcement structure of the rear underbody of a vehicle according to the present disclosure is disclosed for achieving the objects. The rigidity reinforcement structure includes a transverse member disposed in the width direction of a vehicle at a site adjacent to the rear end of the vehicle. The rigidity reinforcement structure includes a rearside member disposed in the longitudinal direction of the vehicle and having a rear end located below the transverse member. The rigidity reinforcement structure includes a transverse reinforcement member formed in the vertical direction of the vehicle and having an upper portion bonded to the transverse member and a lower portion bonded to the rearside member.

The transverse reinforcement member includes a bulkhead part disposed on the upper portion thereof and bonded to the transverse member, a plate part located below the bulkhead part and bonded to the end portion of the rearside member, and a connection part configured to connect the bulkhead part with the plate part.

An upper bonding part extends from the upper end portion, perimeter edge, or partial circumference of the bulkhead part in a flange shape and is formed so that the upper end of the bulkhead part is in surface contact with the inside surface of the transverse member. The upper bonding part is bonded to the transverse member.

The perimeter edge or partial circumference of the plate part is formed with a lower bonding part extending from the plate part and bonded to the end portion of the rearside member.

The bulkhead part and the plate part protrude from the transverse member to the rear of the vehicle at different lengths from each other.

The bulkhead part is formed to be stepped to protrude further to the rear of the vehicle than the plate part, and the connection part is formed to be inclined to connect the bulkhead part with the plate part.

The connection part is formed to be inclined downward toward the front of the vehicle.

The plate part is formed to be stepped to protrude further to the rear of the vehicle than the bulkhead part, and the connection part is formed to be inclined to connect the bulkhead part with the plate part.

The connection part is formed to be inclined upward toward the front of the vehicle.

The rigidity reinforcement structure of the rear underbody of the vehicle includes a transverse outer panel located at the rear of the transverse member, disposed in the width direction of the vehicle, and bonded to the transverse member.

The transverse reinforcement member is disposed between the transverse member and the transverse outer panel.

The transverse outer panel is formed to extend downward to cover the plate part of the transverse reinforcement member.

The transverse reinforcement member is formed smaller in width than the transverse member.

The widthwise center of the transverse reinforcement member and the widthwise center of the rearside member substantially coincide with each other.

Both ends of the transverse member are each connected with the lower end of a D pillar of the vehicle.

The rigidity reinforcement structure of the rear underbody of the vehicle further includes a transverse interior side reinforcement member configured to connect the front surface of the transverse member with the upper surface of the rearside member.

The surface bonded to the front surface of the transverse member and the surface bonded to the upper surface of the rearside member in the transverse interior side reinforcement member are formed in a shape bent together.

The transverse interior side reinforcement member has an L shape in cross section.

The transverse interior side reinforcement member has the vertical surface bonded to the transverse member and the horizontal surface bonded to the rearside member.

According to the rigidity reinforcement structure of the rear underbody of a vehicle according to the present disclosure having the above configuration, the torsional rigidity of the vehicle body is improved, the displacement of the opening of the tailgate is reduced, and the durability performance of the structure is improved by being connected to the lower portion of the D pillar.

While the weight of the vehicle is slightly increased by the connection part, which connects the bulkhead part and the plate part added to improve the rigidity of the vehicle body, the effect of increasing the rigidity relative to the increase in weight is high. Conventionally, the limitations of the layout or the like increase the number of members which are additionally applied to increase rigidity. Accordingly, the weight of the vehicle increases a lot. However, the rigidity reinforcement structure of the present disclosure can obtain the effect of increasing the rigidity with only a minimum or nominal increase in weight of the vehicle.

DESCRIPTION OF SPECIFIC EMBODIMENTS

Hereinafter, a rigidity reinforcement structure of the rear underbody of a vehicle according to the present disclosure is described in detail with reference to the accompanying drawings.

Figure 1:
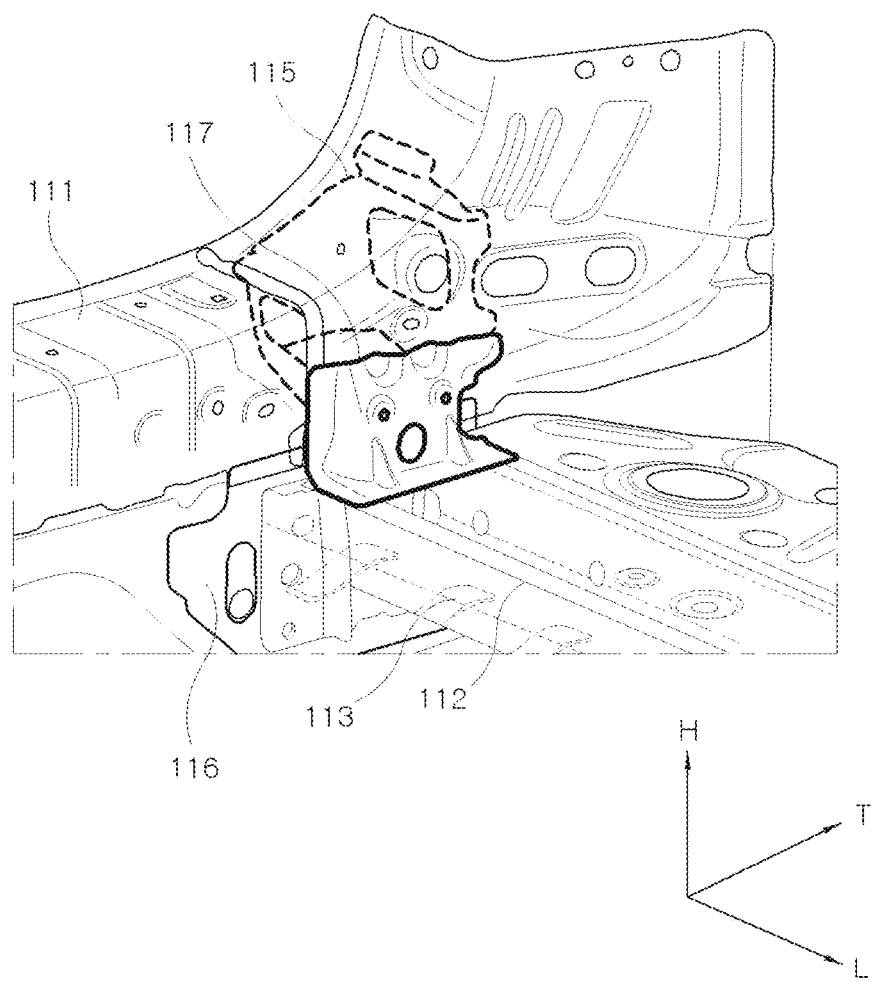
FIG. 1 is a perspective diagram showing a structure of the rear underbody of a vehicle according to the related art.
Figure 2:
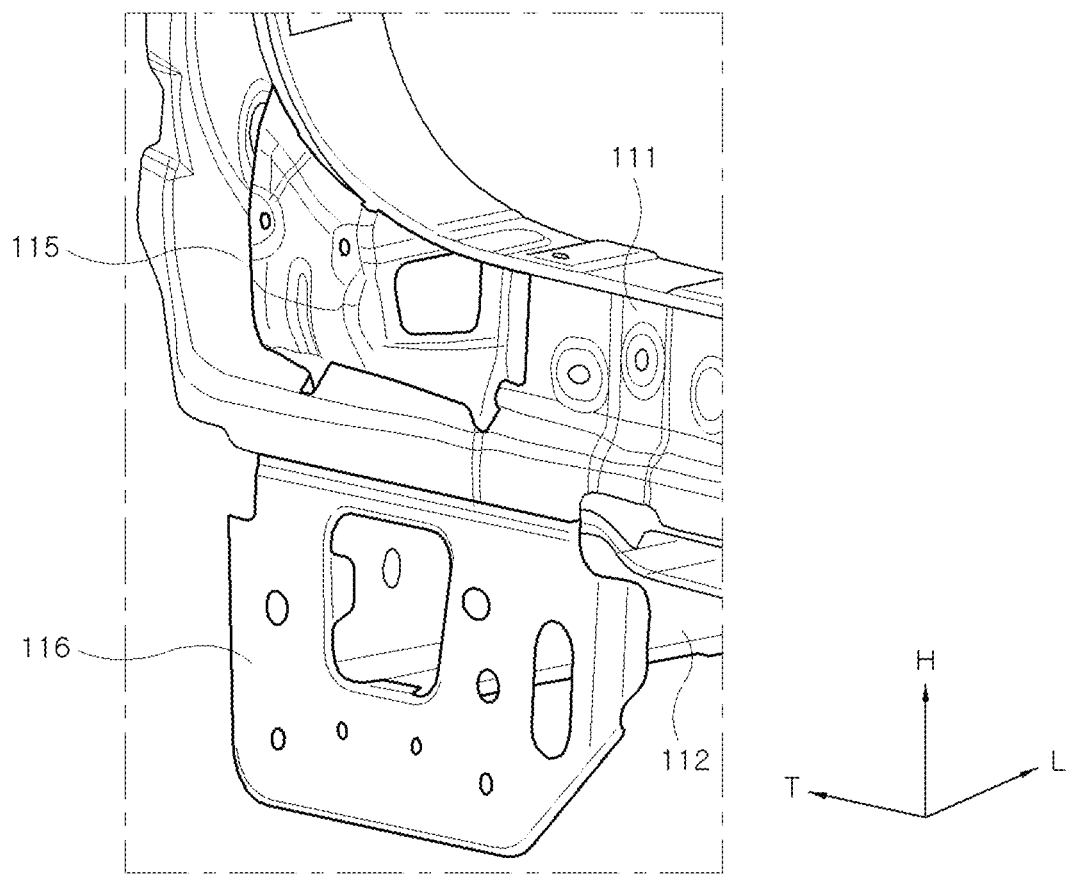
FIG. 2 is a rear perspective diagram showing the structure of the rear underbody of the vehicle according to the related art.
Figure 3:
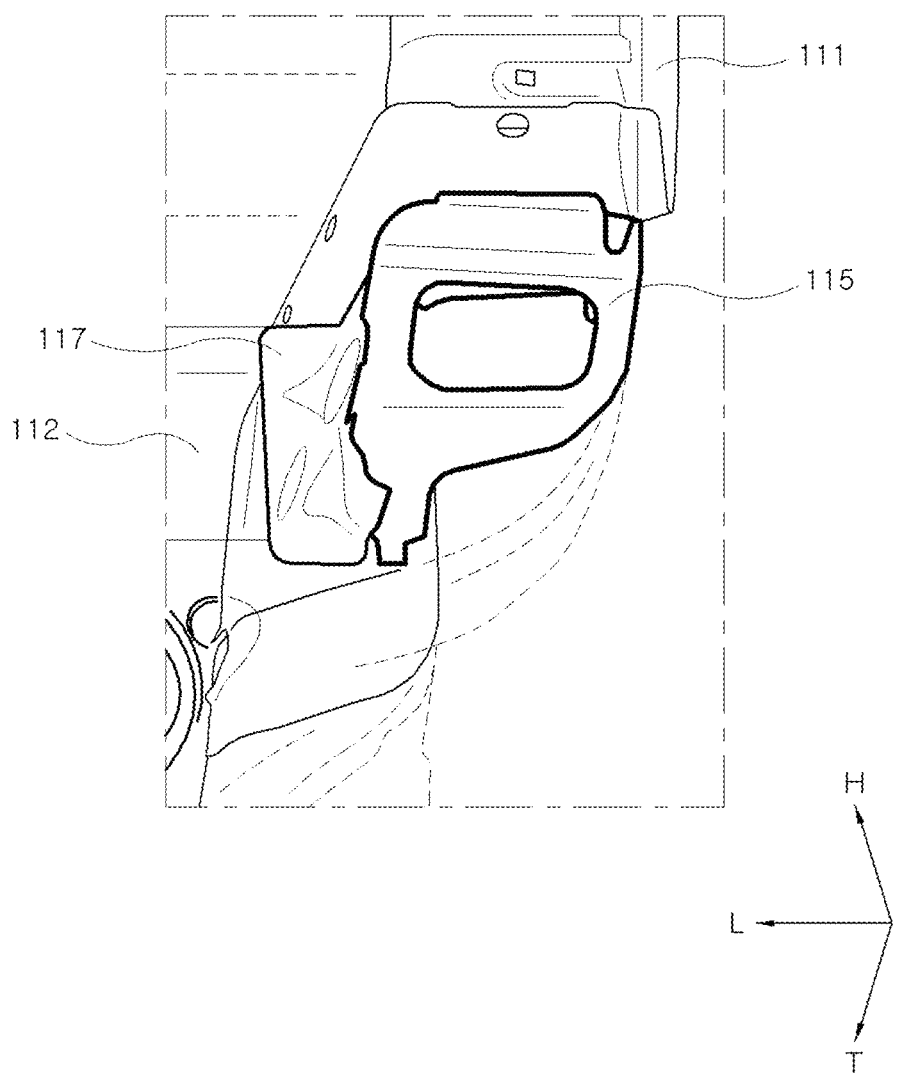
FIG. 3 is a side diagram showing a state where a part of a bulkhead is not bonded in the structure of the rear underbody of the vehicle according to the related art.
Figure 4:
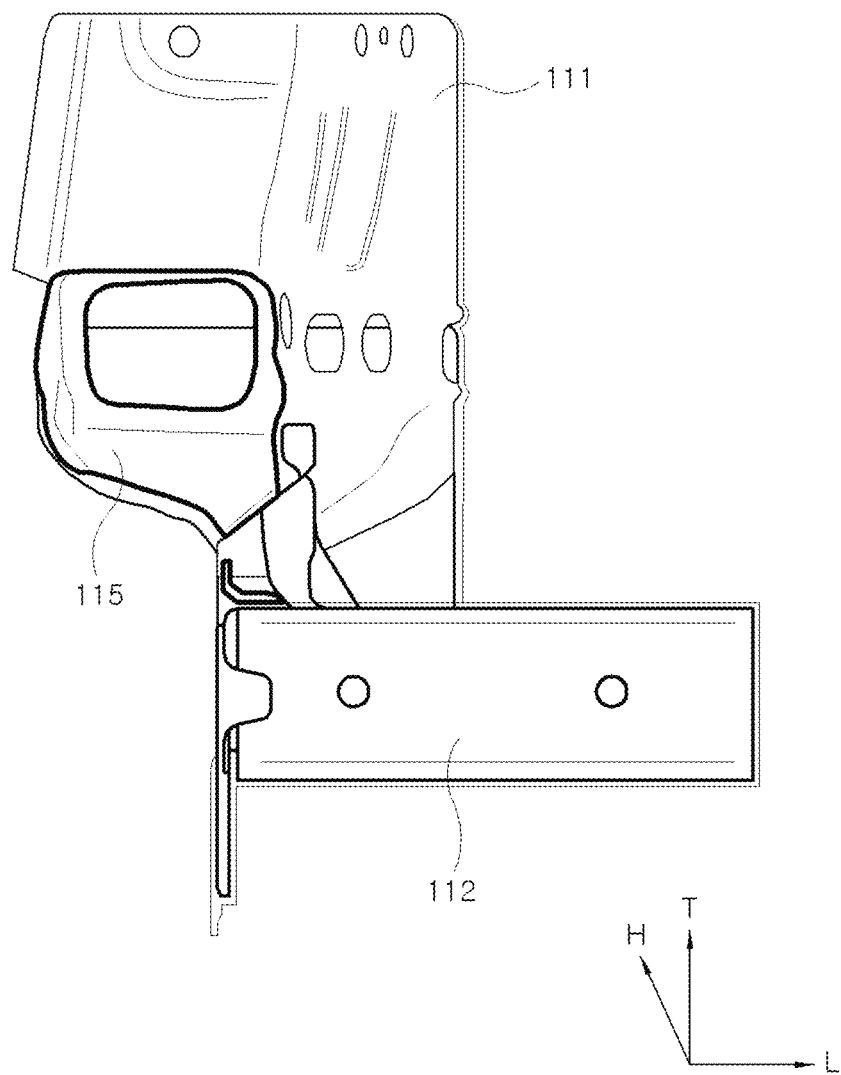
FIG. 4 is a side diagram showing a state where the bulkhead and a rearside member plate are separated in the structure of the rear underbody of the vehicle according to the related art.
Figure 5:
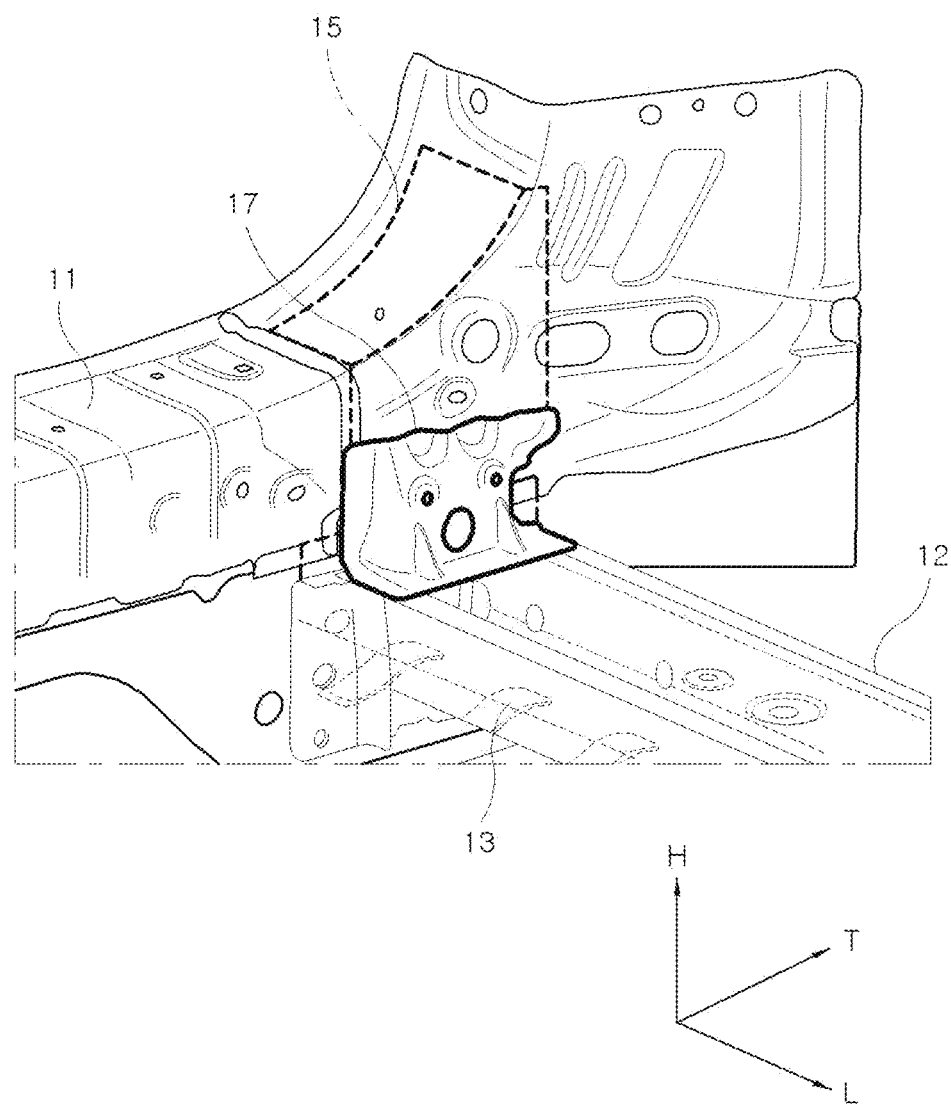
FIG. 5 is a perspective diagram showing a rigidity reinforcement structure of the rear underbody of a vehicle according to the present disclosure.
Figure 6:
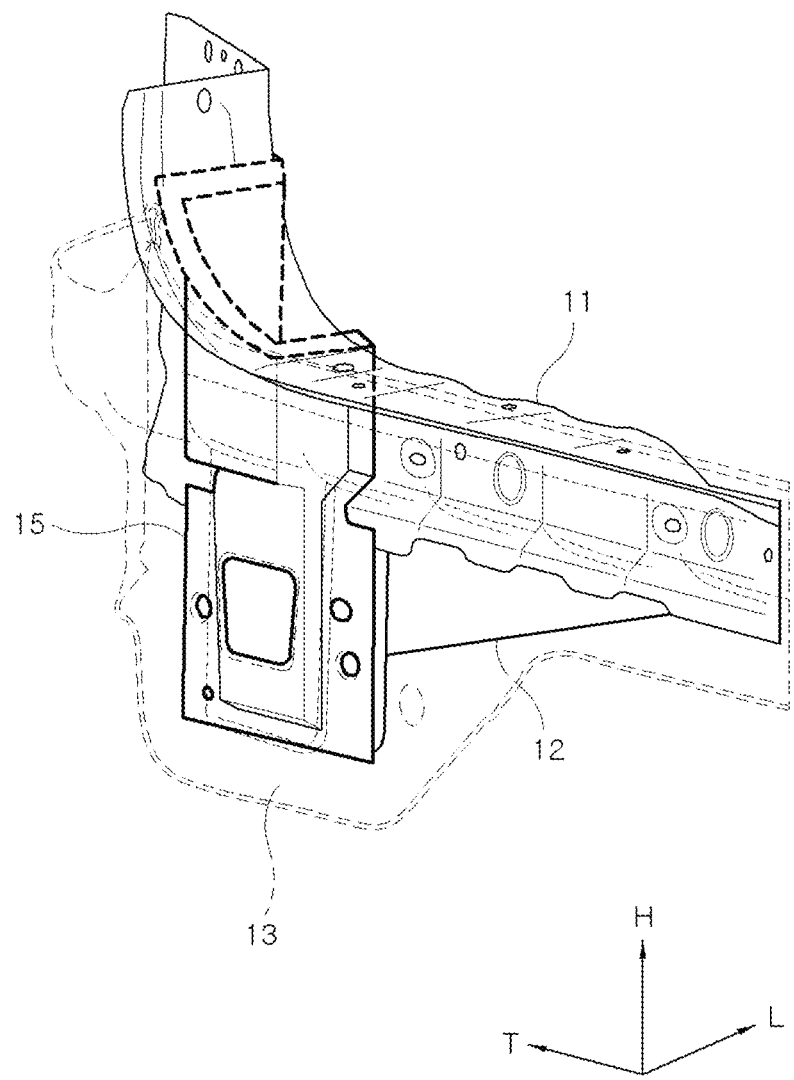
FIG. 6 is a rear perspective diagram showing the rigidity reinforcement structure of the rear underbody of the vehicle according to the present disclosure.
Figure 7:
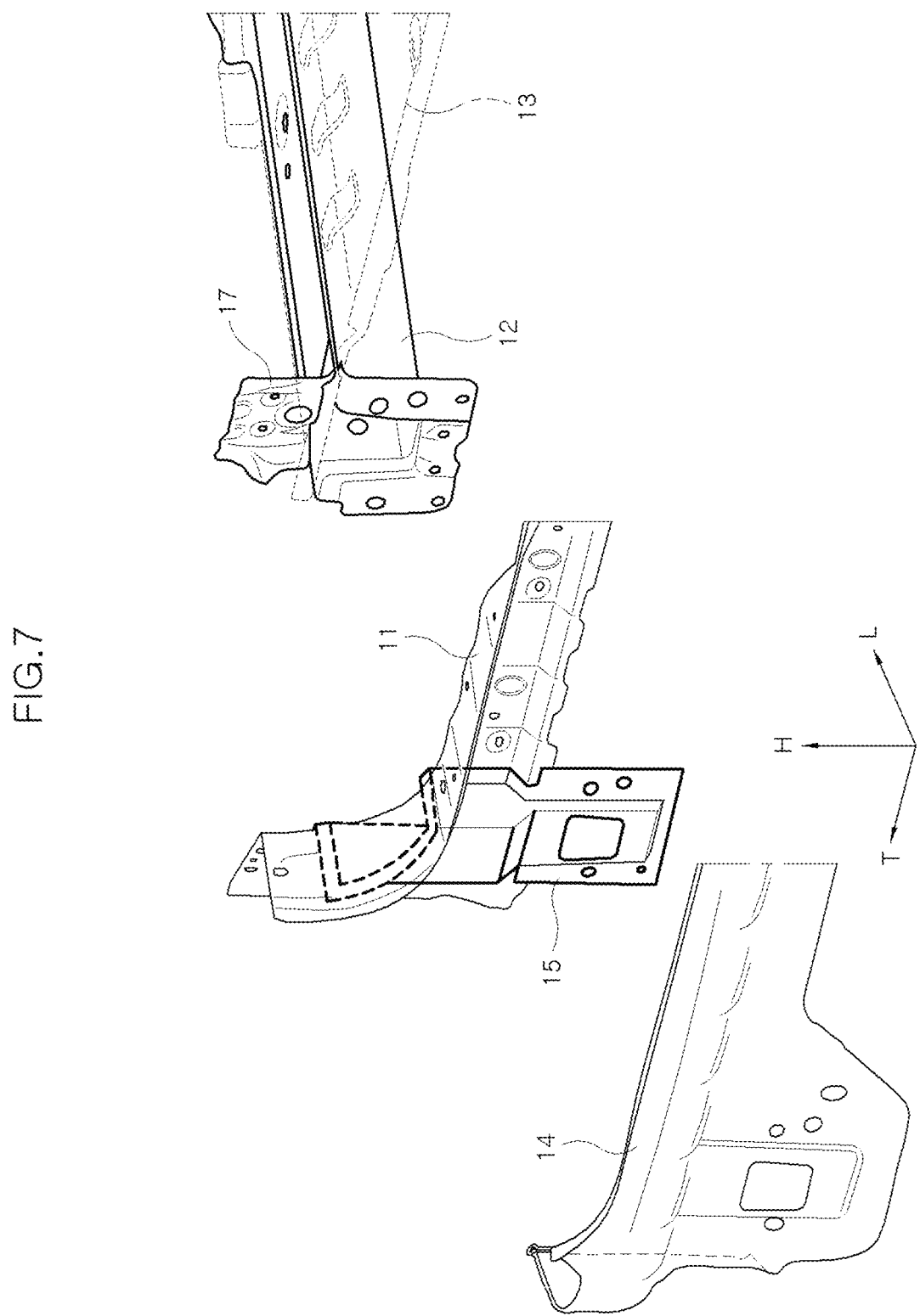
FIG. 7 is a rear exploded perspective diagram showing the rigidity reinforcement structure of the rear underbody of the vehicle according to the present disclosure.
Figure 8:
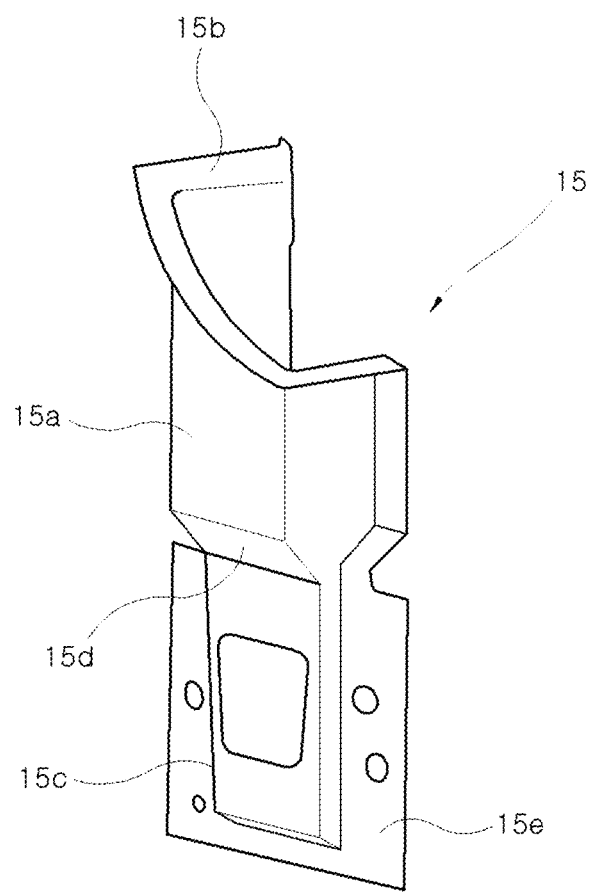
FIG. 8 is a perspective diagram showing a transverse reinforcement member applied to the rigidity reinforcement structure of the rear underbody of the vehicle according to the present disclosure.
Figure 9:
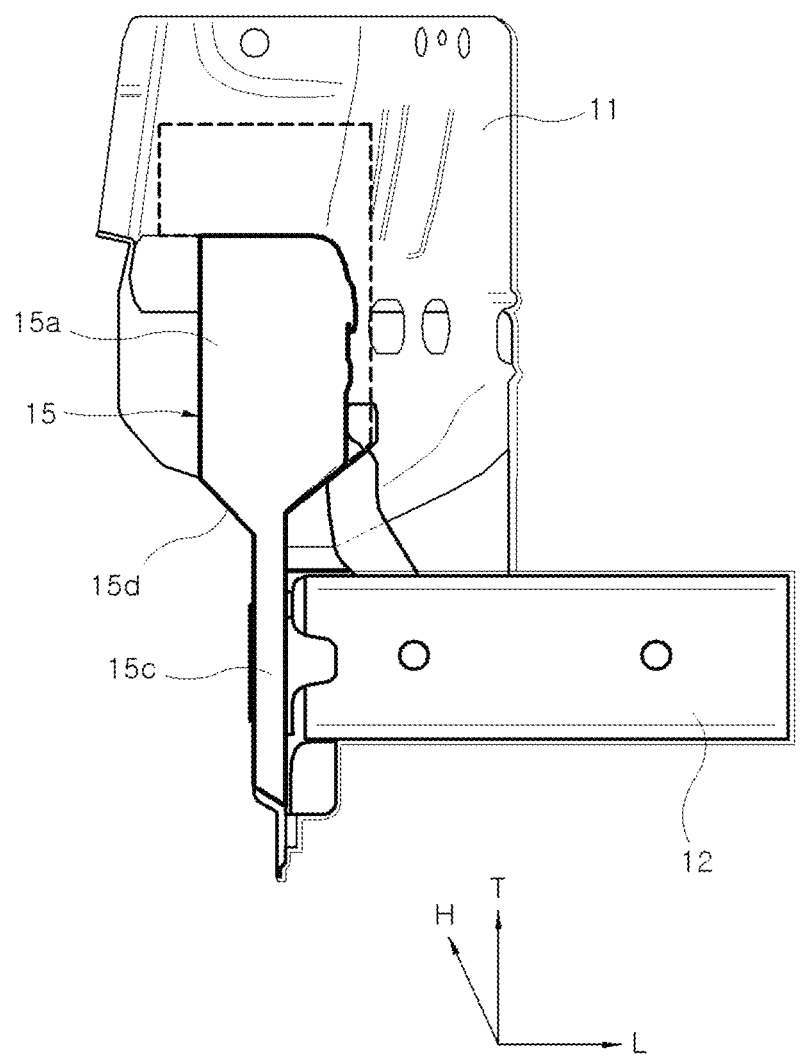
FIG. 9 is a side diagram showing the rigidity reinforcement structure of the rear underbody of the vehicle according to the present disclosure.

The rigidity reinforcement structure of the rear underbody of a vehicle according to the present disclosure is described with reference to FIGS. 5-9. The rigidity reinforcement structure includes a transverse member 11 disposed in the width direction (T direction) of the vehicle at a site adjacent to the rear end of the vehicle. The rigidity reinforcement structure includes a rearside member 12 disposed in the longitudinal direction (L direction) of the vehicle and that has a rear end located below the transverse member 11. The rigidity reinforcement structure includes a transverse reinforcement member 15 formed in the vertical direction of the vehicle (H direction) and that has an upper portion bonded to the transverse member 11 and the lower portion bonded to the rearside member 12.

The transverse member 11 is disposed in the width direction (T direction) of the vehicle at a site adjacent to the rear end of the vehicle. A vehicle such as a Sport Utility Vehicle (SUV) is provided with a D pillar (not shown) which supports a roof and supports the side surface of a tailgate at the rear end of the vehicle. Both ends of the transverse member 11 are each connected to the lower ends of the respective D pillars.

The transverse member 11 forms a closed loop together with the D pillars and the roof, thereby forming a structure of the rear end of the vehicle.

The rearside member 12 is disposed in the longitudinal direction (L direction) of the vehicle, has a rear end located at the lower end of the transverse member 11, and is installed with a floor panel 13. The rear end of the rearside member 12 is connected to the transverse member 11.

The transverse reinforcement member 15 connects the transverse member 11 with the rearside member 12.

The transverse reinforcement member 15 has an upper portion bonded to the transverse member 11 and a lower portion bonded to the rearside member 12.

In other words, the transverse reinforcement member 15 includes a bulkhead part 15a bonded to the rear surface (a surface facing the rear of the vehicle) of the transverse member 11, a plate part 15c located below the bulkhead part 15a and bonded to the rear end of the rearside member 12, and a connection part 15d configured to connect the bulkhead part 15a with the plate part 15c.

The transverse reinforcement member 15 connects the bulkhead part 15a with the plate part 15c through the connection part 15d to become an integrated structure, thereby reinforcing rigidity at the rear of the vehicle.

Since the transverse reinforcement member 15 has the bulkhead part 15a and the plate part 15c disposed vertically, the transverse reinforcement member 15 is formed in the vertical or height direction (H direction) of the vehicle.

The bulkhead part 15a is formed in a box shape and is formed with an open surface or side facing the transverse member 11. The bulkhead part 15a in this embodiment is formed in a shape extending upward to be able to be bonded directly to the transverse member 11. However, if the bulkhead part 15a cannot be directly extended to the transverse member 11 due to molding requirements, a separate member (not shown) may be added between the bulkhead portion 15a and the transverse member 11, and the bulkhead part 15a may be extended to the transverse member 11 indirectly through the separate member.

The upper end portion, perimeter edge, or partial circumference of the bulkhead part 15a is formed with an upper bonding part 15b extending outward from the upper end of the bulkhead part 15a. In other words, the upper bonding part 15b extends in a flange shape from the upper end of the bulkhead part 15a so that the bulkhead part 15a may be bonded to the transverse member 11. The upper bonding part 15b is bonded in a state being in surface contact with the inside surface of the transverse member 11, such that the bulkhead part 15a and the transverse member 11 are bonded.

The plate part 15c is located below the bulkhead part 15a and is bonded to the rear end portion of the rearside member 12. The perimeter edge or partial circumference of the plate part 15c is formed with a lower bonding part 15e extending from the plate part 15c. The lower bonding part 15e is bonded to the rear end of the rearside member 12, such that the transverse reinforcement member 15 and the rearside member 12 are bonded.

The plate part 15c is formed to have a size capable of covering the area of the rear end of the rearside member 12. In other words, the rear end of the rearside member 12 is formed to extend in a direction, perpendicular to the longitudinal direction (L direction) of the vehicle, for bonding. The plate part 15c can be formed to have a size capable of covering the area of the rear end of the rearside member 12, thereby firmly bonding the plate part 15c and the rear end of the rearside member 12.

Meanwhile, the transverse reinforcement member 15 has the bulkhead part 15a and the plate part 15c connected through the connection part 15d, such that the transverse reinforcement member 15 is formed as one structure. The connection part 15d connects the bulkhead part 15a and the plate part 15c to each other so that the bulkhead part 15a and the plate part 15c are integrated. The connection part 15d is formed in an inclined state due to the length difference between the bulkhead part 15a and the plate part 15c protruding from the vehicle. The bulkhead part 15a and the plate part 15c protrude from the transverse member 11 to the rear of the vehicle at different lengths from each other. If the bulkhead part 15a protrudes further toward the rear of the vehicle than the plate part 15c, the connection part 15d is formed to be inclined and to be lower toward the front of the vehicle. Alternatively, if the plate part 15c protrudes further to the rear of the vehicle than the bulkhead part 15a, the connection part 15d is formed to be inclined to be higher toward the front of the vehicle.

The transverse reinforcement member 15 has a width (a length in the L direction) formed smaller than the width (length in the L direction) of the transverse member 11 so that the transverse reinforcement member 15 is located in the section of the transverse member 11. In other words, in FIG. 9, the width (left and right direction in the drawing) of the transverse reinforcement member 15 is formed greater than the width (left and right direction in the drawing) of the transverse reinforcement member 15.

In addition, the transverse reinforcement member 15 is located along the same line as the rearside member 12. In other words, the widthwise (T direction) center of the transverse reinforcement member 15 and the widthwise (T direction) center of the rearside member 12 substantially coincide with each other.

The transverse reinforcement member 15 according to the present disclosure has a structure in which the prior known bulkhead 115 and the prior known rearside member plate 116 (which are separated according to the related art) are integrated, thereby improving the Body In White (BIW) torsional rigidity of the vehicle body.

A transverse outer panel 14 is bonded to the rear outside of the transverse member 11 to finish the vehicle body structure of the rear of the vehicle. The transverse outer panel 14 is also disposed in the width direction (T direction) of the vehicle. The transverse outer panel 14 is bonded to the rear outside of the transverse member 11 to cover the rear of the transverse member 11. Thus, the transverse outer panel 14 covers the transverse reinforcement member 15, such that the transverse reinforcement member 15 is located between the transverse member 11 and the transverse outer panel 14.

In particular, the transverse outer panel 14 is formed to extend downward to cover the lower portion of the transverse reinforcement member 15, i.e., the plate part 15c, such that the transverse outer panel 14, the plate part 15c, and the rear end of the rearside member 12 are bonded together, thereby improving the strength.

A transverse interior side reinforcement member 17 is provided at the interior side of the vehicle to connect the transverse member 11 with the rearside member 12 to reinforce the strength.

The transverse interior side reinforcement member 17 connects the transverse member 11 and the rearside member 12, which are formed at different angles from each other. Thus, the surface bonded to the front surface of the transverse member 11 and the surface bonded to the upper surface of the rearside member 12 in the transverse interior side reinforcement member 17 are formed in a shape bent together. In this embodiment, the transverse interior side reinforcement member 17 has an shape in cross section and has a vertical surface bonded to the transverse member 11 and a horizontal surface bonded to the rearside member 12. In other words, the transverse interior side reinforcement member 17 has the vertical surface bonded to the front surface of the transverse member 11 and the horizontal surface bonded to the upper surface of the rearside member 12. This is to connect the transverse member 11 with the rearside member 12 at the interior side of the vehicle, thereby reinforcing the strength.

The transverse interior side reinforcement member 17 is installed at the interior side of the vehicle. Thus, the transverse interior side reinforcement member 17 supports a site where the transverse member 11 and the rearside member 12 are connected, together with the transverse reinforcement member 15 in all directions of the vehicle. Accordingly, the strength of the site where the transverse member 11 and the rearside member 12 are connected is improved.

Meanwhile, at least one method of spot welding, Laser Screw Welding (LSW), $CO_2$ welding, and mechanical bonding can be applied to perform the bonding of each component.

The rigidity reinforcement structure of the rear underbody of the vehicle according to the present disclosure connects the site where the transverse member 11 and the rearside member 12 are connected at the rear of the vehicle, such as an SUV, by using the transverse reinforcement member 15 having the integrated structure. Thus, the weight of the vehicle only slightly increases but the effect of improving the rigidity is remarkable, as compared to the structure in which the bulkhead and the rearside member plate are mounted separately as in the related art.

In addition, in the structure in which the bulkhead and the rearside member plate are separately installed, there is also a case where an additional member is further needed to improve the strength. Such a structure is not easy to install according to the layout of the vehicle, but by applying the transverse reinforcement member 15, it is possible to reduce the number of members installed to reinforce the strength, thereby ultimately reducing the weight of the vehicle.

What is claimed is:

1. A rigidity reinforcement structure of a rear underbody of a vehicle, the rigidity reinforcement structure comprising:
    a transverse member disposed in a width direction of the vehicle at a site adjacent to a rear end of the vehicle;
    a rearside member disposed in a longitudinal direction of the vehicle and having a rear end located below the transverse member; and
    a transverse reinforcement member formed in a vertical direction of the vehicle and having an upper portion bonded to the transverse member and a lower portion bonded to the rearside member.

2. The rigidity reinforcement structure of claim 1, wherein the transverse reinforcement member comprises:
    a bulkhead part disposed on the upper portion thereof and bonded to the transverse member;
    a plate part located below the bulkhead part and bonded to the rear end of the rearside member; and
    a connection part configured to connect the bulkhead part with the plate part.

3. The rigidity reinforcement structure of claim 2,
    wherein an upper bonding part extends from the upper portion of the bulkhead part in a flange shape and is formed so that the upper portion of the bulkhead part is in surface contact with an inside surface of the transverse member, and
    wherein the upper bonding part is bonded to the transverse member.

4. The rigidity reinforcement structure of claim 2, wherein a perimeter edge of the plate part is formed with a lower bonding part extending from the plate part and bonded to the rear end of the rearside member.

5. The rigidity reinforcement structure of claim 2, wherein the bulkhead part and the plate part protrude from the transverse member to a rear of the vehicle at different lengths from each other.

6. The rigidity reinforcement structure of claim 5, wherein the bulkhead part is formed to be stepped to protrude further to the rear of the vehicle than the plate part, and wherein the connection part is formed to be inclined to connect the bulkhead part with the plate part.

7. The rigidity reinforcement structure of claim 6, wherein the connection part is formed to be inclined to be downward toward a front of the vehicle.

8. The rigidity reinforcement structure of claim 5, wherein the plate part is formed to be stepped to protrude further to the rear of the vehicle than the bulkhead part, and wherein the connection part is formed to be inclined to connect the bulkhead part with the plate part.

9. The rigidity reinforcement structure of claim 8, wherein the connection part is formed to be inclined to be upward toward a front of the vehicle.

10. The rigidity reinforcement structure of claim 2, further comprising a transverse outer panel located at a rear of the transverse member, disposed in the width direction of the vehicle, and bonded to the transverse member.

11. The rigidity reinforcement structure of claim 10, wherein the transverse reinforcement member is disposed between the transverse member and the transverse outer panel.

12. The rigidity reinforcement structure of claim 10, wherein the transverse outer panel is formed to extend downward to cover the plate part of the transverse reinforcement member.

13. The rigidity reinforcement structure of claim 2, wherein the transverse reinforcement member is formed smaller in width than the transverse member.

14. The rigidity reinforcement structure of claim 2, wherein a widthwise center of the transverse reinforcement member and a widthwise center of the rearside member substantially coincide with each other.

15. The rigidity reinforcement structure of claim 1, further comprising a transverse interior side reinforcement member configured to connect a front surface of the transverse member with an upper surface of the rearside member.

16. The rigidity reinforcement structure of claim 15, wherein a surface of the transverse interior side reinforcement member bonded to the front surface of the transverse member and a surface of the transverse interior side reinforcement member bonded to the upper surface of the rearside member are formed in a shape bent together.

17. The rigidity reinforcement structure of claim 15, wherein the transverse interior side reinforcement member has an L shape in cross section.

18. The rigidity reinforcement structure of claim 14, wherein the transverse interior side reinforcement member has a vertical surface bonded to the transverse member and a horizontal surface bonded to the rearside member.

* * * * *